United States Patent
Soditch et al.

(10) Patent No.: US 6,742,841 B1
(45) Date of Patent: Jun. 1, 2004

(54) VEHICLE SEAT WITH AUTO-FOLD LEG

(75) Inventors: Milton S. Soditch, Brighton, MI (US); Sean A. Riley, South Lyon, MI (US); Vladimir Nastevski, Royal Oak, MI (US); Douglas A. Siewert, Ann Arbor, MI (US); Brian Holder, Livonia, MI (US); Robert A. Wilson, Toledo, OH (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/444,433

(22) Filed: May 23, 2003

(51) Int. Cl.[7] .................................................. A47C 1/02
(52) U.S. Cl. ...................................................... 297/335
(58) Field of Search ................................ 297/331, 332, 297/333, 334, 335; 296/65.05, 65.08; 29/428

(56) References Cited

U.S. PATENT DOCUMENTS

| | | | |
|---|---|---|---|
| 1,888,136 A | * 11/1932 | McDermott | |
| 4,846,486 A | 7/1989 | Hobson | 280/47.25 |
| 4,889,383 A | 12/1989 | Jones | 297/16 |
| 5,374,106 A | 12/1994 | Hoefer | 297/236 |
| 5,547,205 A | 8/1996 | Cabedo | 280/30 |
| 5,570,931 A | 11/1996 | Kargilis et al. | 297/378.12 |
| 5,641,202 A | 6/1997 | Rus | 297/335 |
| 5,671,948 A | * 9/1997 | Susko et al. | |
| 5,797,649 A | 8/1998 | Snell et al. | 297/14 |
| 5,800,015 A | 9/1998 | Tsuchiya et al. | 297/331 |
| 5,803,546 A | * 9/1998 | Yamazaki | |
| 5,984,397 A | 11/1999 | Dawson et al. | 296/65.09 |
| 6,231,101 B1 | * 5/2001 | Kamida et al. | |
| 6,299,251 B1 | * 10/2001 | Harper | |
| 6,460,929 B2 | 10/2002 | Kamida | 297/344.1 |

FOREIGN PATENT DOCUMENTS

| | | | |
|---|---|---|---|
| DE | 19943454 C1 | 4/2001 | B60N/1/36 |
| JP | 2002-353468 | 12/2002 | |
| WO | WO 02/100679 | 12/2002 | |

* cited by examiner

Primary Examiner—Milton Nelson, Jr.
(74) Attorney, Agent, or Firm—Foley & Lardner LLP

(57) ABSTRACT

One embodiment of the invention relates to a vehicle seat. The vehicle seat comprises a seat back coupled to a vehicle by a base bracket or directly to the vehicle. A seat base is coupled to the seat back and configured to rotate from a seating position to a stored position. A leg assembly is coupled to the seat base and configured to rotate from a deployed position to a retracted position. An indicator is coupled to the seat base to indicate a predetermined condition of the seat base.

20 Claims, 5 Drawing Sheets

VEHICLE SEAT WITH AUTO-FOLD LEG

BACKGROUND OF THE INVENTION

The present invention relates generally to the field of vehicle seats and more particularly relates to a vehicle seat having automatic folding legs.

It is known to provide a vehicle seat, for example, an automotive seat having a reclineable back. It is also known to provide a vehicle seat having a reclineable back and an independently movable seat base. It is also known to provide a vehicle seat having a movable seat base that pivots to an upright position. It is also known to provide a vehicle seat having an adjustable lumbar consisting of a flexible member having a first end anchored and a second end moved with respect to the first end to cause the flexible member to vary its shape to provide adjustable support within the lumbar region of an automotive seat.

Notwithstanding the known devices, there remains a significant need to develop a vehicle seat having a seat base which is capable of pivoting to an upright position with a one-hand operation of a user. Further, there remains a need to provide a vehicle seat that includes an automatic folding leg assembly. Further, there remains a need to provide a vehicle seat having an indicator to notify a user of a predetermined condition of the seat base.

It is desirable to provide a vehicle seat that provides one or more of these or other advantageous features. Other features and advantages will be made apparent from the present description.

SUMMARY OF THE INVENTION

One embodiment of the invention relates to a vehicle seat. The vehicle seat comprises a seat back coupled to a vehicle. A seat base is coupled to the seat back and configured to rotate from a seating position to a stored position. A leg assembly, having a leg member, is coupled to the seat base and configured to rotate from a deployed position to a retracted position. An indicator is coupled to the seat base to indicate a predetermined condition of the seat base. Another embodiment of the vehicle seat includes a cable coupled to the seat back and the leg assembly, wherein the cable moves the leg assembly from a deployed position to a retracted position when the seat base is moved from the seating position to the stored position and the leg assembly clears a cargo zone located under at least a portion of the seat base.

There is also provided a rear seat of a passenger carrying vehicle. The rear seat comprises a seat back coupled to the vehicle. A seat base is coupled to the seat back and configured to rotate from the seating position to a stored position. A leg assembly is coupled to the seat base and configured to rotate from a deployed position to a retracted position. An indicator is coupled to the seat base to indicate a predetermined condition of the seat base. Another embodiment of the rear seat includes a cable coupled to the seat back and leg assembly. The cable moves the leg assembly from the deployed position to the retracted position when the seat base is moved from the seating position to the stored position and the leg assembly clears a cargo zone located under at least a portion of the seat base. The rear seat may also include a biasing assembly coupled to the seat base and a leg assembly to assist in moving the leg assembly from the seating position to the stored position.

There is further provided a method for automatic retraction of a leg assembly coupled to a vehicle seat mounted in a vehicle. The vehicle seat includes a seat back and a seat base. The method comprises the steps of providing a cable of a predetermined length. Coupling one end of the cable to the seat back and coupling another end of the cable to the leg assembly. The leg assembly moves from a deployed position to a retracted position as the seat base is moved from a seating position to a retracted position and the leg assembly clears a cargo zone located under at least a portion of the seat base. Another embodiment of the method includes the step of providing a biasing member coupled to the leg assembly and the seat base configured to bias the leg assembly from the seating position to the stored position to assist the user of the vehicle seat to move the seat base.

DETAILED DESCRIPTION OF THE PREFERRED EMBODIMENTS

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in aircraft, railroad vehicles, nautical vehicles or other environments. The illustrated seat is a back seat of a van or SUV and is also referred to as a stadium seat. The seat may be configured as a split seat or a bench-type seat.

Second, the seat of the present invention is illustrated in the FIGURE as a padded seat having certain contours, trim and the like. While this configuration is presently preferred, a wide variety of seat configurations and appearances will benefit from use of the mechanical support and movement mechanisms. Also the exterior of the seat can be covered by fabric, vinyl, leather or other materials known and used in the seating art.

Third, with regard to the seat described later herein, substantial modifications can be made without departing from the invention's intended scope. For example, while certain mechanical systems are described to move seat components to achieve certain results, other mechanisms, manual or powered could be substituted therefore. For example, where a screw drive is used in moving the thorax pivot location, other mechanical equivalents including, but not limited to, four bar linkages, air or hydraulic cylinders, air bladders, rack and pinion systems, cams and cables, gears, etc. could be employed. Another example is that for a pelvis support, i.e., a pair of clam-shell like devices (which are themselves already known in the art). They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Figure 1:
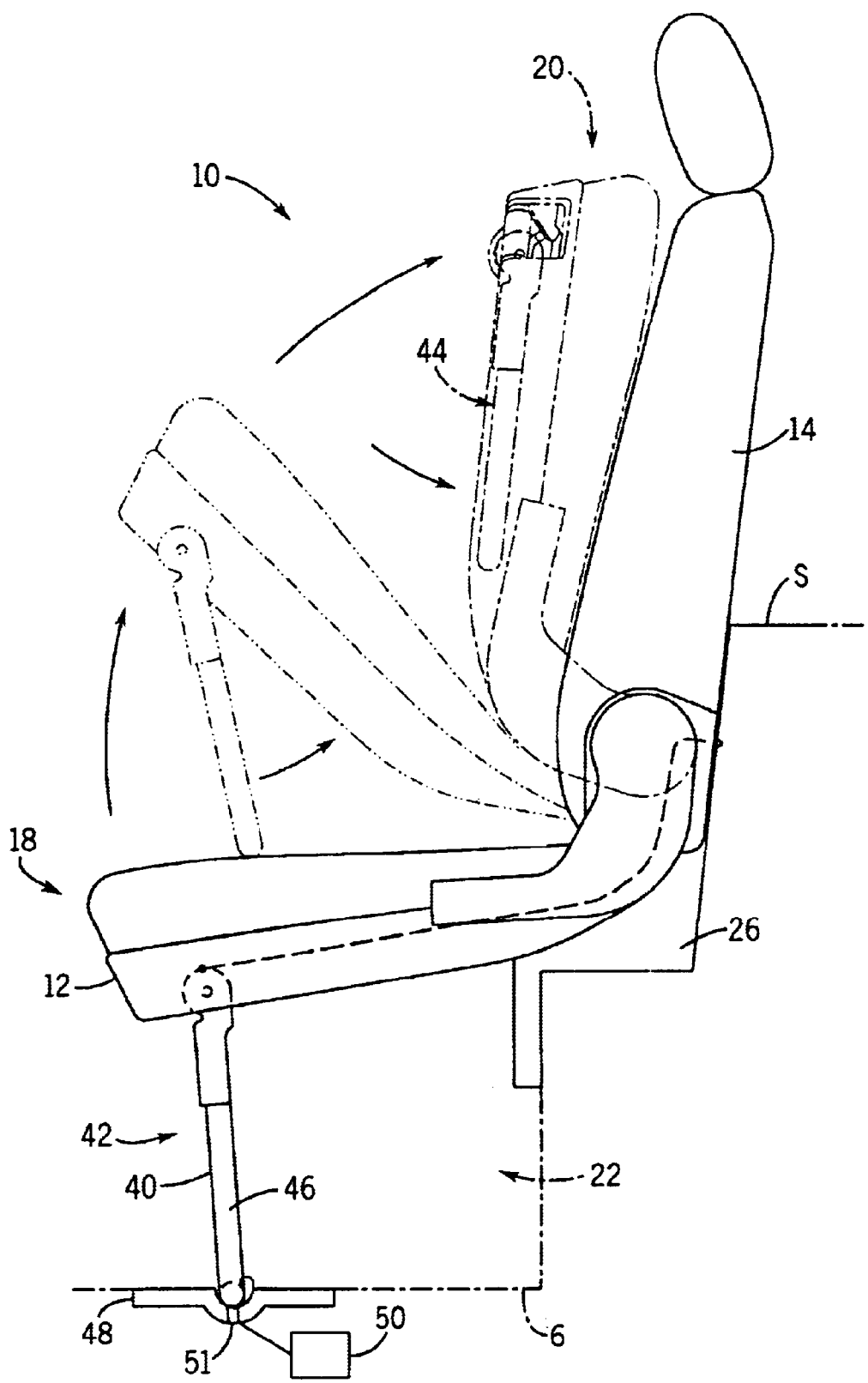
FIG. 1 is a side plan view of an exemplary embodiment of a vehicle seat and illustrating a seating position (solid line), intermediate position, and stored position (broken line).

Referring generally to the Figure and in particular to FIG. 1 there is shown a vehicle seat 10 for use in a vehicle 5 of any known type. The vehicle seat 10 includes a seat base 12 which supports a cushioned seat and a seat back 14. Seat base 12 and seat back 14 are independently pivotally connected to a base bracket 26. Such configuration allows occupant to use a fixed non-movable back or a recline/dump type back. The seat 10 can be either a manually adjustable seat or may be provided with electric motors to provide automated adjustment and electronic control of the seat. Such manipulation can be accomplished by the use of a change of position mechanism coupled to the seat 14 back and seat base 12. It is also contemplated that 2 separate mechanism may be used to provide flexibility in seat configuration. The change of position mechanism may provide for the back frame to move in proportional relation to the seat base 12 at a predetermined ratio, for example, moving the seat 10 one and a half millimeter per degree of seat 14 back movement if a recliner mechanism is provided. The seat 10 is connected to the floor of the support structure 6 of a vehicle 5 in any of a variety of configurations or designs which allow for the movement and adjustment of the seat 10 within the vehicle 5. The vehicle seat 10 may optionally include a headrest which may also be adjustable with respect to an occupant of the seat 10 such as any known or appropriate headrest.

The seat back 14 and seat base 12 of the vehicle seat 10 preferably includes a cushion 16 and a pair of side bolsters positioned on the sides of the seat back 14. The cushion 16 is preferably contoured to receive and support the body of an occupant of the vehicle seat 10. The side bolsters are also preferably aligned with respect to the cushion 16 and contoured to provide an angled, gradual support of the lateral side portions of an occupant of the vehicle seat 10. The cushion 16 and side bolsters preferably include a foam material (not shown) and a cover of any appropriate or known material such as cloth, vinyl, leather, etc. The cushion 16 and bolsters include support frames as more fully described below.

The seat back 14 further includes a back frame including a cover of any appropriate or known material such as cloth, vinyl, leather, etc. and which preferably matches the cover material of the cushion 16, side bolsters and seat base 12. However, it should be understood that a different material may be used on any element.

Referring now to FIGS. 1–9, there is provided a seat 10 for a vehicle 5. The seat 10 comprises a seat back 14 coupled to the vehicle 5. A seat base 12 and seat back 14 are coupled to the base bracket 26 and with the seat base 12 configured to rotate from a seating position 18 to a stored position 20. The seat back 14 is coupled by the base bracket 26 which is attached to the vehicle support structure 6 of the vehicle 5. A link bracket 28 is pivotably connected to the base bracket 26 by a suitable pivot pin. The base bracket 26 and the link bracket 28 can be composed of any suitable material such as metal (steel for example) or an engineered plastic of suitable strength.

Figure 2:
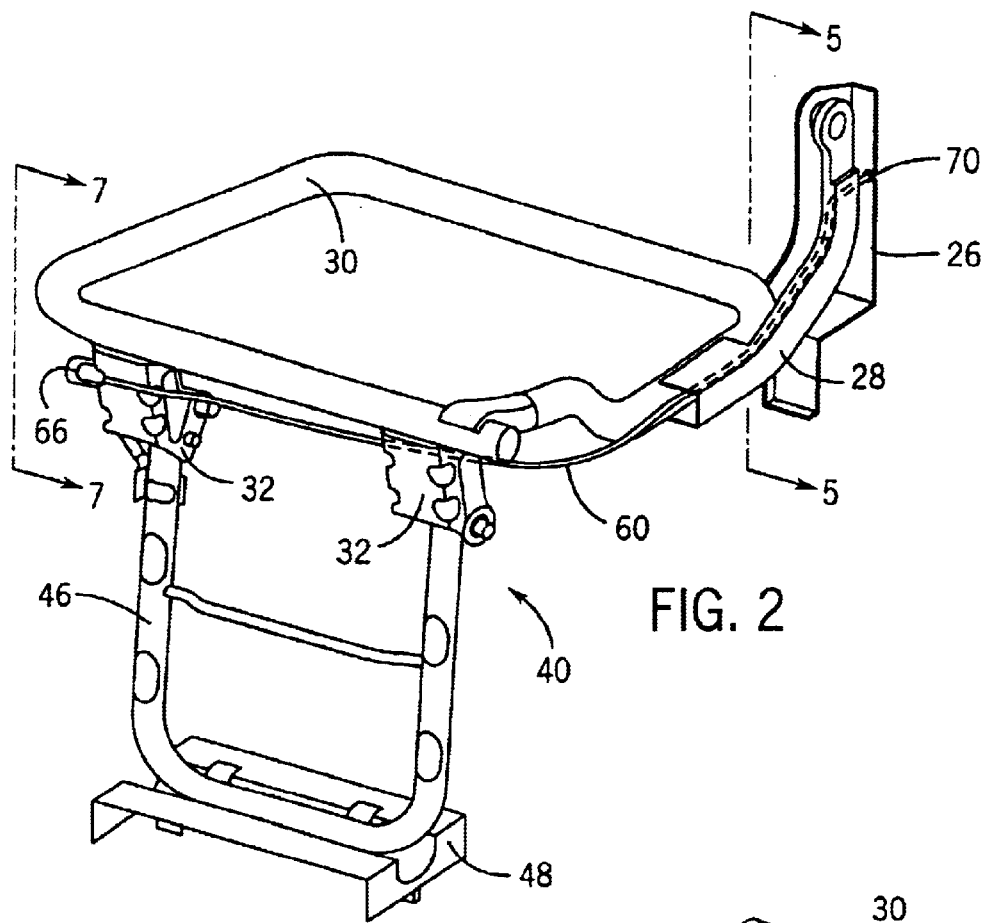
FIG. 2 is a partial perspective view of an exemplary embodiment of a seat, without cushions, illustrating an automatic leg retraction mechanism and leg-assembly.

FIG. 2, illustrates a cushion frame 30 without the cushion 16 for clarity purposes. It should be understood that the length and width of the cushion frame 30 can be of any suitable length as determined by the manufacturer of the vehicle seat 10.

Figure 3:
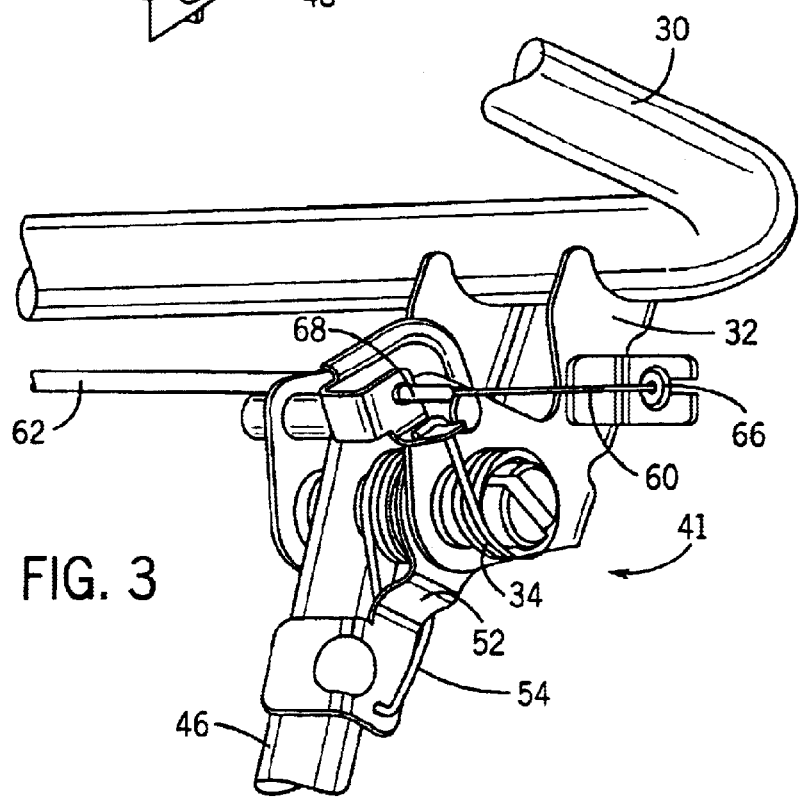
FIG. 3 is a partial perspective rear view of an exemplary embodiment of the leg assembly illustrated in FIG. 2, with a biasing assembly.
Figure 4:
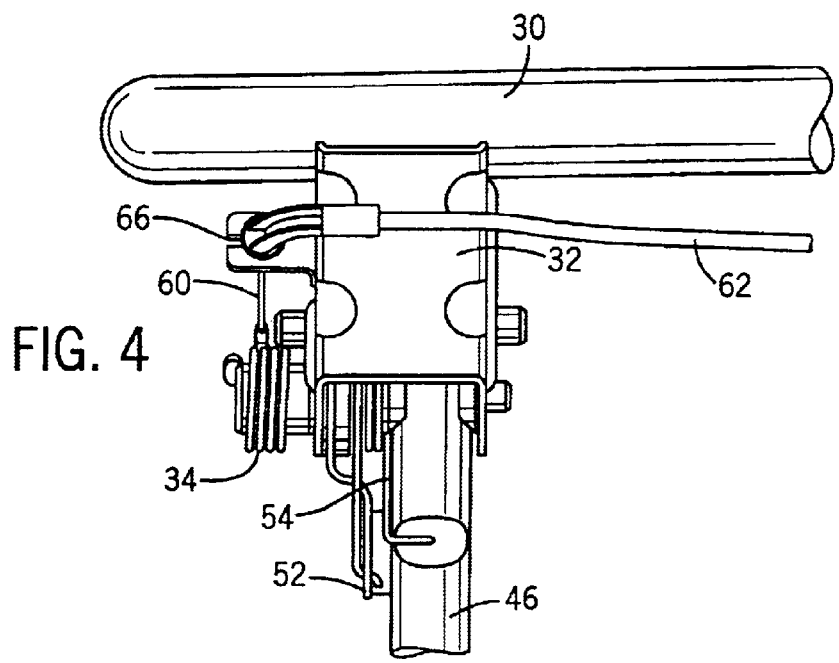
FIG. 4 is a partial perspective front view of the exemplary embodiment of the leg assembly of FIG. 3.
Figure 9:
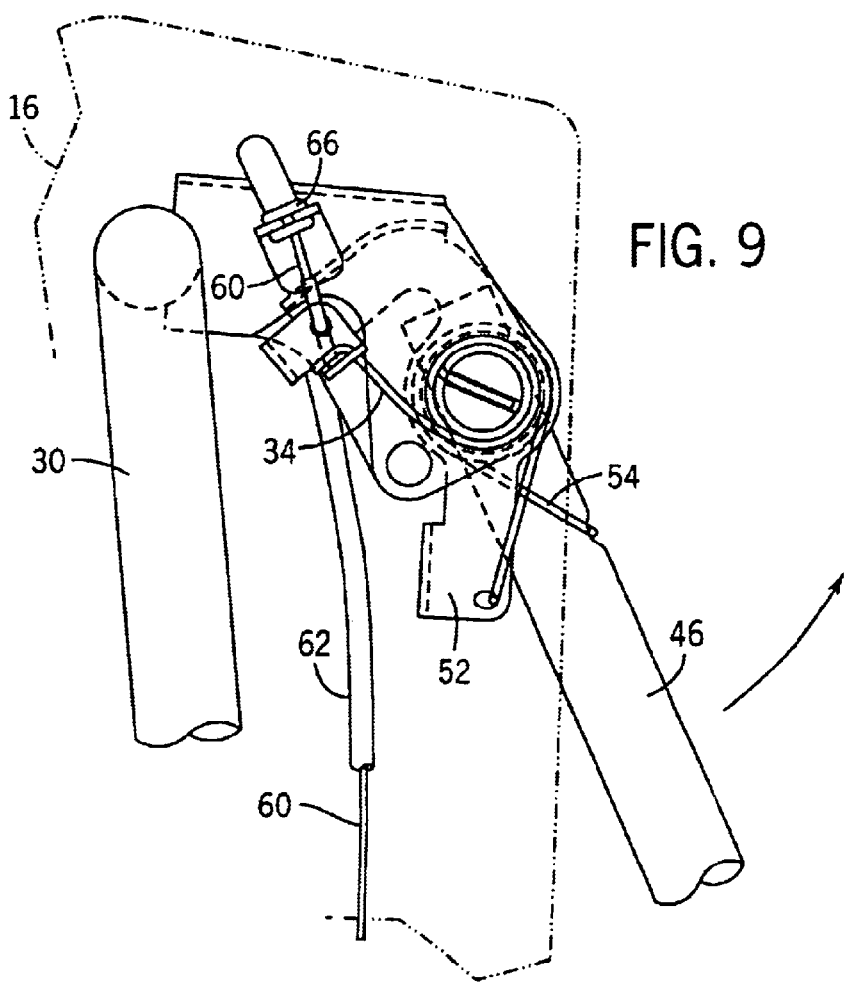
FIG. 9 is a partial view of the seat illustrated in FIG. 8, with the leg member of the leg assembly movable from the seat base without stretching the cable, referred to as a "break-away" feature.

A leg assembly 40 is coupled to the cushion frame 30 by a plurality of cushion brackets 32. The cushion brackets 32 are in a spaced apart relationship and can be fastened to the cushion frame 30 by any suitable means such as bolts, welding, or an adhesive. The cushion brackets 32 can be composed of any suitable material such as metal or an engineered plastic. A leg member 46 is coupled to the cushion frame 30 by the leg assembly 40. (See FIG. 2) The leg member 46 in the leg assembly 40 is configured to rotate from a deployed position 42 to a retracted or stored position 44. (See FIG. 1) The leg assembly 40 includes a leg bracket 52 which is attached to the cushion bracket 32 by a pivot pin. A leg spring 54 biases the leg member 46 towards the leg bracket 52 as seen in FIGS. 3 and 4. The leg spring 54 maintains tension between the leg bracket 52 and the leg member 46 so that the leg member 46 follows the leg bracket 52 and cushion bracket 32 during movement of the seat base 12. The cushion bracket 32 is fixed to the cushion frame 30 and only moves in conjunction with the cushion frame. The illustrated leg member 46 is a single U-shaped tube. It should be understood that the leg member can have any suitable cross-section and may also be configured as two separate leg members operable in unison.

A leg detent 48 is coupled to the vehicle 5. The leg detent 48 typically is located on the vehicle support structure 6 and includes an actuator or sensor 51 which is coupled to an indicator 50. The leg detent 48 may also be a leg catch retainer. (See FIGS. 1 and 2) When the leg assembly 40 is in the deployed position 42, as shown in FIGS. 1 and 2, the leg member 46 engages the leg detent 48 and contacts the actuator 51. A signal is transmitted to the indicator 50 to show that the leg assembly 40 is properly engaged with the leg detent 48. The actuator 51 can be any suitable device such as a micro switch. The indicator 50 can be electronic or mechanical device that gives a positive indication that the leg assembly 40 is properly engaged with the leg detent 48. The indicator 50 can be, for example, a light on the dashboard of the vehicle 5 or a colored flag associated with the seat 10.

The seat 10 can include an automatic folding capability that is provided by a cable 60 coupled to the seat back 14 and the leg assembly 40. The cable 60 is routed through a cable conduit 62. The cable conduit 62 has a first conduit anchor 64 connected to the link bracket 28 and the second conduit anchor 66 is coupled to the cushion bracket 32. (See FIGS. 2, 3, 5, and 6.) A cable 60 is anchored to the back bracket 26 at a first cable anchor 70 and the other end of the cable 60 is connected to the leg bracket 52 at a second cable anchor 68. (See FIGS. 3, 4, 5 and 7.) A cable 60 is of a predetermined length wherein the cable 60 moves the leg assembly 40 from the deployed position 42 to the retracted position 44 when the seat base 12 is moved from the seating position 18 to the stored position 20 and the leg assembly 40 clears a cargo zone 22 located under at least a portion of the seat base 12. (See FIG. 1.)

Figure 5:
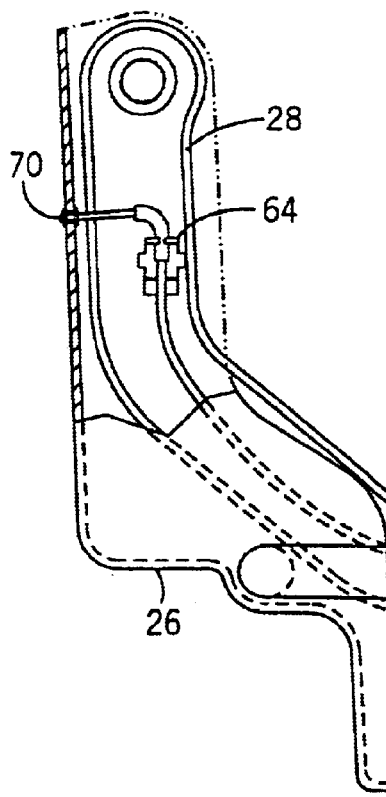
FIG. 5 is a section view along line 5—5 in FIG. 2, illustrating an exemplary embodiment of a cable and cable conduit anchored to a back bracket and banana bracket, respectively, with the seat in a seating position.
Figure 6:
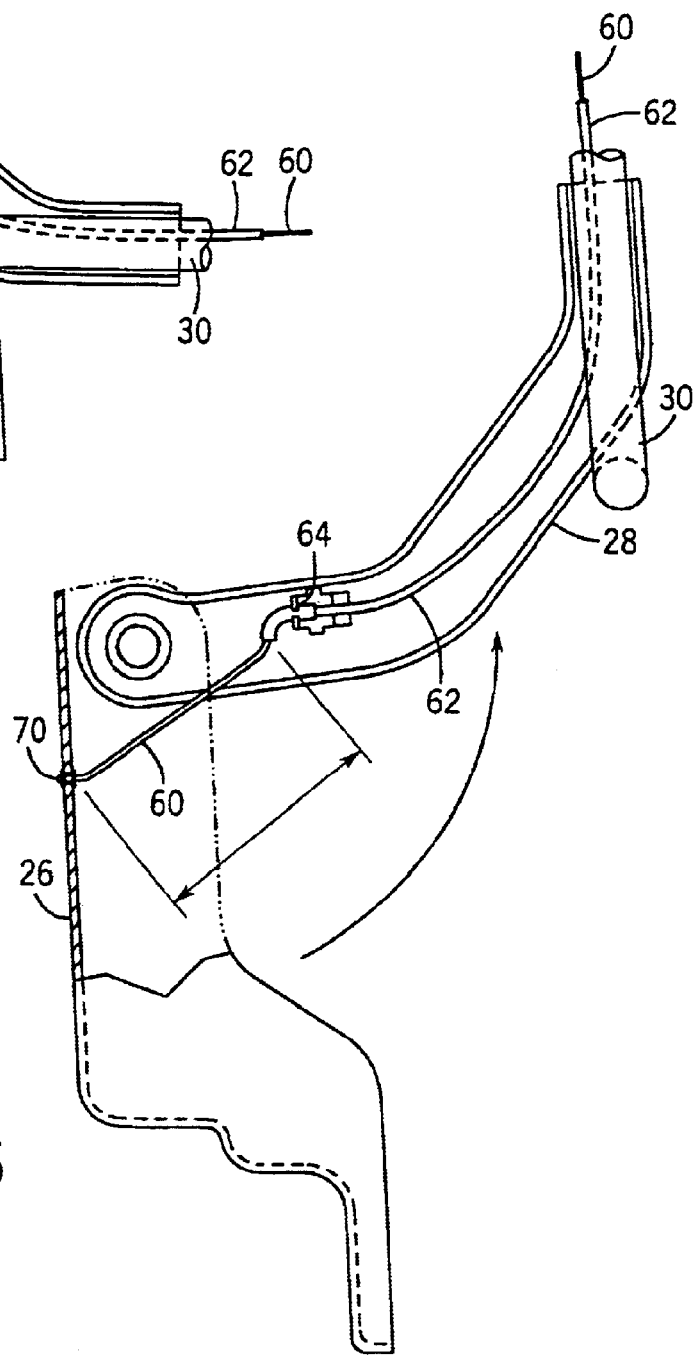
FIG. 6 is a section view of the seat illustrated in FIG. 5, with the seat in the stored position.
Figure 7:
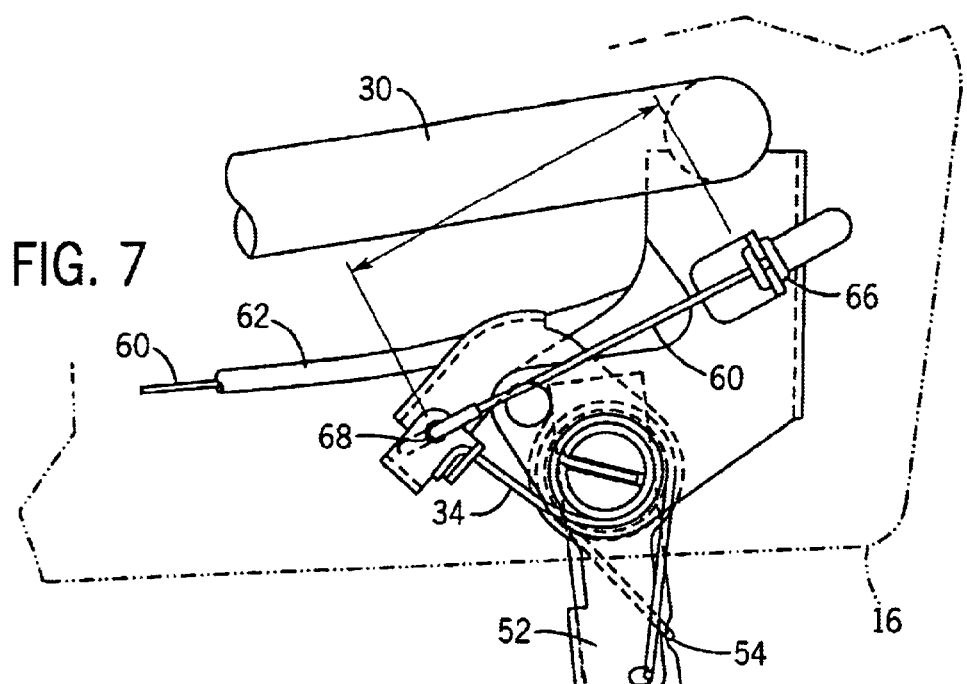
FIG. 7 is a partial view of a seat along line 7—7 in FIG. 2, illustrating a cable and cable conduit anchored to the leg assembly, with the seat (cushion in broken line) in a seating position.
Figure 8:
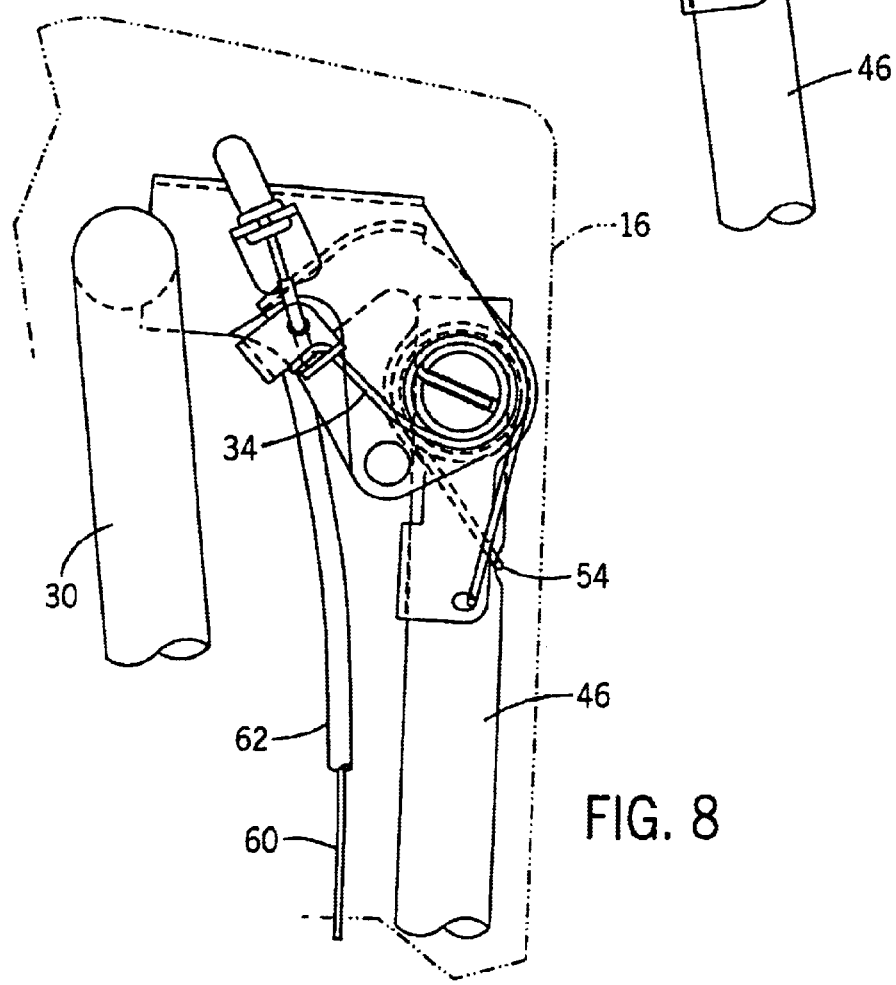
FIG. 8 is a partial view of the seat illustrated in FIG. 7, with the seat (cushion in broken line) in a stored position.

The end of the cable 60 is attached to the base bracket 26 at the cable anchor 70. The cable conduit 62, through which the cable is routed, has a first conduit anchor 64 connected to the link bracket 28 as seen in FIGS. 5 and 6. The other end of the cable 60 is attached to the leg bracket 52 at a second cable anchor 68 (See FIG. 3) and the other end of the conduit 62 is attached to the conduit anchor 66 which is rigidly attached to cushion bracket 32.

When the seat base 12 which includes the cushion 16 and the cushion frame 30 moves to a stored position 20, the cable 60 is pulled because of increasing distance between the attachment point 70 at the base bracket 26 and the conduit end anchor 64 at the link bracket 28 (See FIGS. 5 and 6). That arrangement causes the cable 60 to pull the leg bracket 52 which rotates from the vertical position into a position parallel to the plane of the cushion 16 (See FIGS. 7 and 8). The leg member 46 is connected with a spring to the leg bracket 52 and the spring 54 tension between the bracket and leg causes the leg member 46 to follow the leg bracket 52. As the leg bracket 52 rotates about the pivot pin, the leg member 46 rotates with it around the same pin which forces the leg member 46 into the retracted position 44. (See FIGS. 1, 7 and 8.)

When the seat base 12 is in the stored position 20 and the leg assembly 40 is in the retracted position 44 as shown in FIG. 1, the seat 10 is provided with a "break-away" feature. The break-away feature is provided by attaching the cable 60 to the leg bracket 52 rather than to the leg member 46. When the leg member 46 is pulled while the cushion 16 is in the stored position 20, the cable 60 does not stretch (pull) because it is connected to the leg bracket 52 and not the leg member 46. (See FIG. 9.) When a user pulls on the leg member 46 of the leg assembly 40, the leg member 46 pivots about the pivot pin and pulls against a leg spring 54. The leg spring 54 biases the leg towards the leg bracket 52 as described above.

When the seat base 12 is moved from the stored position 20 to the seating position 18, a leg/cushion spring 34 forces the leg bracket 52 which in turn forces the leg member 46 to rotate forward to the deployed position 42. The leg member 46 follows the leg bracket 52 and the cushion bracket 32 as a result of the tension of the biasing assembly 41. The biasing assembly 41, as described above includes the leg/cushion spring 34 and the leg spring 54. The illustrated springs 34 and 54 are torsion springs mounted on the pivot pin that couples the cushion bracket 32, the leg bracket 52 and the leg member 46, all of which is referred to as the leg assembly 40.

There is also provided a method for automatic retraction of a leg assembly 40 coupled to a vehicle seat 10 mounted in a vehicle 5. The vehicle seat includes the seat back 14 and the seat base 12. The method comprises the steps of providing a cable 60 of a predetermined length. Coupling one end of the cable 60 to the base bracket 26 and coupling the other end of the cable 60 to the leg assembly 40. The leg assembly 40 moves from a deployed position 42 to a retracted position 44 as the seat base 12 is moved from the seating position 18 to a retracted position 20 and the leg assembly 40 clears a cargo zone 22 located under at least a portion of the seat base 12.

Another embodiment of the method includes the step of providing a biasing member 41 coupled to the leg assembly 40 and the seat base 12 and configured to bias the leg assembly 40 from the deployed position 42 to the retracted position 44 to assist the user of the vehicle 10 to move the seat base 12.

The method can also include the step of providing a leg detent 48 coupled to the vehicle 5 and configured to engage the leg assembly 40 when the leg assembly 40 is in the deployed 42 position. An indicator 50 can be coupled to one of the leg detent 48 and the seat base 12 to indicate a predetermined condition of the seat base 12. The indicator includes an actuator 51 mounted in the leg detent 48 and configured to contact the leg assembly 40 when the leg assembly 40 is properly engaged with the leg detent 48. The pre-determined condition can be that the seat 10 is properly deployed and engaged with the leg detent 48 or that the seat 10 is not properly deployed.

The method can also include the step of providing a leg bracket 52 coupled to the leg assembly 40 wherein the leg bracket 52 disengages the leg member 46 from the seat base 12 when a predetermined force on the leg member 46 is exceeded. The predetermined force is the biased tension of the leg spring 54. This allows the user to, as described above, pull the leg member 46 without stretching the cable 60.

Although the disclosed embodiments have been described in some detail, it should be understood that various changes, substitutions and alterations can be made to the embodiments without departing from their spirit and scope.

What is claimed is:

1. A seat for a vehicle, the seat comprising:

a seat back configured to be coupled to the vehicle;

a seat base configured to be coupled to the vehicle and configured to rotate from a seating position to a stored position;

a leg assembly having a leg member coupled to the seat base and configured to rotate from a deployed position to a retracted position; and an indicator coupled to the seat to indicate a predetermined condition of the seat base.

2. The seat of claim 1, including a leg detent configured to be coupled to the vehicle and configured to engage the leg assembly when the leg assembly is in the deployed position.

3. The seat of claim 2, wherein the indicator includes an actuator mounted in the leg detent and configured to contact the leg assembly when the leg assembly is properly engaged with the leg detent.

4. The seat of claim 3, wherein the indicator is one of a mechanical member and an electric device.

5. The seat of claim 1 including a biasing assembly coupled to the seat base and leg assembly to assist in moving the leg assembly from the deployed position to the retracted position.

6. The seat of claim 1, including a cable coupled to the seat back and the leg assembly, wherein the cable moves the leg assembly from the deployed position to the retracted position when the seat base is moved from the seating position to the stored position and the leg assembly clears a cargo zone located under at least a portion of the seat base.

7. The seat of claim 1, including a leg bracket coupled to the leg assembly wherein the leg bracket disengages the leg member from the seat base when a predetermined force on the leg member is exceeded.

8. A rear seat of a passenger carrying vehicle, the rear seat comprising:

a seat back configured to be coupled to the vehicle;

a seat base configured to be coupled to the vehicle and configured to rotate from a seating position to a stored position;

a leg assembly coupled to the seat base and configured to rotate from a deployed position to a retracted position; and an indicator coupled to the seat to indicate a predetermined condition of the seat base.

9. The rear seat of claim 8, including a leg detent configured to be coupled to the vehicle and configured to engage the leg assembly when the leg assembly is in the deployed position.

10. The rear seat of claim 9, wherein the indicator includes an actuator mounted in the leg detent and configured to contact the leg assembly when the leg assembly is properly engaged with the leg detent.

11. The rear seat of claim 10, wherein the indicator is one of a mechanical member and an electric device.

12. The rear seat of claim 8, including a biasing assembly coupled to the seat base and leg assembly to assist in moving the leg assembly from the deployed position to the retracted position.

13. The rear seat of claim 8, including a cable coupled to the seat back and the leg assembly, wherein the cable moves the leg assembly from the deployed position to the retracted position when the seat base is moved from the seating position to the stored position and the leg assembly clears a cargo zone located under at least a portion of the seat base.

14. The rear seat of claim 8, including a removable bracket coupled to the leg assembly wherein the removable bracket disengages the leg assembly from the seat base when a predetermined force on the leg assembly is exceeded.

15. A method for automatic retraction of a leg assembly coupled to a vehicle seat mounted in a vehicle, with the vehicle seat including a seat back and a seat base, the method comprising the steps of:

providing a cable of a predetermined length;

coupling one end of the cable to the seat back; and coupling another end of the cable to the leg assembly, wherein the leg assembly moves from a deployed position to a retracted position as the seat base is moved from a seating position to a retracted position and the leg assembly clears a cargo zone located under at least a portion of the seat base.

16. The method of claim 15, including the step of providing a biasing member coupled to the leg assembly and the seat base configured to bias the leg assembly from the deployed position to the retracted position to assist a user of the vehicle seat to move the seat base.

17. The method of claim 15, including the step of providing a leg detent coupled to the vehicle and configured to engage the leg assembly when the leg assembly is in the deployed position.

18. The method of claim 15, including the step of providing an indicator coupled to one of the leg detent and the seat base to indicate a predetermined condition of the seat base.

19. The method of claim 18, wherein the indicator includes an actuator mounted in the leg detent and configured to contact the leg assembly when the leg assembly is properly engaged with the leg detent.

20. The method of claim 15, including the step of providing a leg bracket coupled to the leg assembly wherein the leg bracket disengages the leg member from the seat base when a predetermined force on the leg member is exceeded.

* * * * *